US007021161B2

(12) United States Patent
Recio et al.

(10) Patent No.: US 7,021,161 B2
(45) Date of Patent: Apr. 4, 2006

(54) GEAR BEARING FOR A STEERING WHEEL POSITION SENSOR

(75) Inventors: Mario A. Recio, Chihuahua (MX); Juan C Lozano, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 69 days.

(21) Appl. No.: 10/654,740

(22) Filed: Sep. 4, 2003

(65) Prior Publication Data

US 2005/0050966 A1 Mar. 10, 2005

(51) Int. Cl.
*G01L 3/02* (2006.01)

(52) U.S. Cl. ............... 73/862.333; 73/862; 73/862.339

(58) Field of Classification Search ............................... 73/862.331–862.336, 862, 862.339; 180/444
See application file for complete search history.

(56) References Cited

U.S. PATENT DOCUMENTS 4,342,279 A * 8/1982 Seko et al. ................... 116/31
4,789,342 A * 12/1988 Shitanoki ..................... 439/15
5,243,188 A * 9/1993 Hattori et al. ......... 250/231.17
5,646,523 A * 7/1997 Kaiser et al. ............ 324/207.2
5,808,250 A * 9/1998 Torii et al. ............... 200/19.01
5,823,905 A * 10/1998 Torii et al. .................. 475/149
6,367,337 B1 * 4/2002 Schlabach ............. 73/862.331
6,400,142 B1 6/2002 Schroeder
6,443,020 B1 9/2002 Lin et al.
6,458,914 B1 10/2002 Kimura et al.
6,832,661 B1 * 12/2004 Palfenier et al. ............ 180/444
2002/0059838 A1 * 5/2002 Nagaoka et al. ....... 73/862.328

* cited by examiner

*Primary Examiner*—Max Noori
*Assistant Examiner*—Alandra Ellington
(74) *Attorney, Agent, or Firm*—Jimmy L. Funke

(57) ABSTRACT

An improved conventional steering wheel position sensor including a housing, a main gear, an auxiliary gear enmeshed with the main gear and a ring shield at the auxiliary gear. A ring shield wall of the ring shield has a low rise portion adjacent the main gear and a high rise portion distally therefrom. A truncated plate is connected to the high rise portion, and the auxiliary gear is bearingly mounted to an axle of the truncated plate so as to be rotatable without contacting the ring shield.

11 Claims, 4 Drawing Sheets

GEAR BEARING FOR A STEERING WHEEL POSITION SENSOR

TECHNICAL FIELD

The present invention relates to steering wheel position sensors, also referred to as absolute handwheel position sensors (AHPS).

BACKGROUND OF THE INVENTION

Steering wheel position sensors are used in automotive applications for electronic monitoring of steering functions of a motor vehicle. An example of a current steering wheel position sensor is depicted at FIGS. 1 through 5.

The prior art steering wheel position sensor 10 uses non-contacting Hall effect sensor technology, producing dual outputs of indication of steering wheel rotation: a coarse output and a fine output. The conventional steering wheel sensor 10 is designed for electronic control systems requiring steering wheel position input. Typical applications of the conventional steering wheel position sensor 10 include, for example, chassis controlled stability enhancement systems, electrically assisted power steering, steer-by-wire systems and navigation systems.

As shown at FIGS. 1 and 2, the conventional steering wheel position sensor 10 includes a housing 14 having a mounting hole 16. The conventional steering wheel position sensor 10 is mounted to the steering column 12 (shown at FIG. 1) via the steering column passing through an engagement aperture 20 of a large main gear 22, wherein the hole 16 and the engagement aperture 20 are concentrically aligned with each other. When the steering wheel of the motor vehicle is turned, the steering column 12 rotates the main gear 22 inside the housing 14. The main gear 22 has teeth 22*a* which rotatably drive a small auxiliary gear 24 via its respective teeth 24*a* enmeshed therewith. Both of the main and auxiliary gears 22, 24 are composed of DELRIN 100 (DELRIN is a registered trademark of DuPont for an acetal resin material), and each respectively therewithin contain an annular permanent magnet 26*a*, 26*b*(see FIG. 5). Two linear Hall effect sensors 28*a*, 28*b* sense magnetic field rotation of the main gear 22. A pair of linear Hall sensors 28*c*, 28*d*; arranged perpendicularly relative to each other (shown best at FIG. 4), sense the magnetic field rotation of the auxiliary gear 24. Signals from all four sensors 28*a*, 28*b*, 28*c*, 28*d* are acquired by a microcontroller 30 and processed to find the instantaneous angle of rotation of the steering column 12. This angle is then used to set the values of the duty cycle for both pulse width-modulated outputs. The microcontroller 30 simultaneously produces two pulse width-modulated outputs based on the values previously set: one output with coarse resolution and a second output with fine resolution, which appear, via suitable wiring, at wires emanating from an electrical connector 18.

As can be understood by reference to FIGS. 3 through 5, the auxiliary gear 24 has an annular lip 24*b* and an annular base 24*c* connected to the annular lip (see FIG. 5). The auxiliary gear 24 is rotatably interfaced with a ring shield 32 in the form of an annular ring shield wall 32*a* which confines the magnetic field of the auxiliary gear. The ring shield 32 provides a gear bearing 34 for the auxiliary gear 24 at two locations of guidance for the auxiliary gear, an upper guide surface 34*u* at the top surface of the ring shield wall which slidingly abuts the annular lip 24*b* and an inner guide surface 34*i* of the inside surface of the ring shield wall which slidingly abuts the annular base 24*c*. Both of the guide surfaces 34*u*, 34*i* involve sliding friction at the aforesaid abutments with the auxiliary gear 24. Further, the annular magnet 26*b* of the auxiliary gear 24 tends to attract the ring shield 32, causing frictional effects (ie., wear, heat, vibration, noise, back lash, etc.) between the auxiliary gear and the upper and inner guide surfaces 34*u*, 34*i* to be enhanced.

While the conventional steering wheel position sensor 10 performs quite admirably, it would be desirable, if somehow possible, to eliminate the frictional effects which occur between the auxiliary gear and the ring shield.

SUMMARY OF THE INVENTION

The present invention is an improved conventional steering wheel position sensor in which the improvement lies in elimination of frictional effects between the auxiliary gear and the ring shield.

The improved steering wheel position sensor according to the present invention has all components as hereinbefore described with respect to the prior art steering wheel position sensor, including the holed housing and apertured main gear, wherein only the environs of the auxiliary gear are now modified.

The auxiliary gear is provided with a centrally disposed axle hole. Additionally, while the annular base remains connected thereto, an annular lip is now absent.

The ring shield is modified, wherein the ring shield wall height adjacent the main gear is similar to that of the above described conventional ring shield wall; however, distally from the main gear, the height of the ring shield is increased to a height above the auxiliary gear and is covered by a truncated plate, the truncation coinciding with the height change of the ring shield wall adjacent the main gear. The truncated plate is dimensioned relative to the ring shield such that an axle connected with the truncated plate is disposed at the axial center of the ring shield. The axle is connected to the truncated plate in perpendicular relation thereto.

An improved auxiliary gear bearing according to the present invention resides in the axle being received by the axle hole, and a head of the axle holding, in freely rotatable fashion, the auxiliary gear relative to the ring shield.

As a consequence of the aforesaid modification, the auxiliary gear is able to rotate on the axle without any frictional engagement with the ring shield, the only contact being at the bearing afforded by the axle. This structural improvement results in the elimination of frictional effects occasioned by the former use of the upper and inner guide surfaces, both of which being now obviated.

Accordingly, it is an object of the present invention to provide an improved axle mounting for the auxiliary gear of a conventional steering wheel position sensor which obviates upper and inner ring shield bearing surfaces.

This and additional objects, features and advantages of the present invention will become clearer from the following specification of a preferred embodiment.

DESCRIPTION OF THE PREFERRED EMBODIMENT

Figure 1:
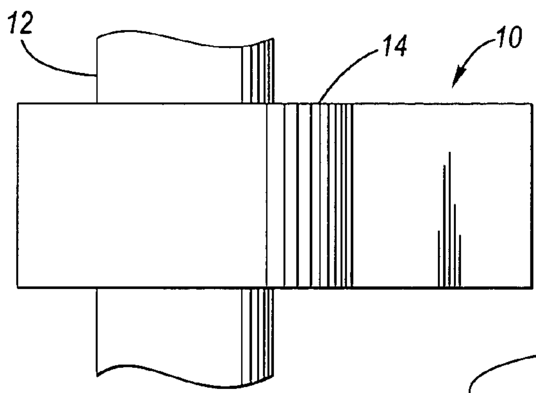
FIG. 1 is a perspective view of a prior art steering wheel position sensor, also known as an absolute handwheel position sensor (AHPS).
Figure 2:
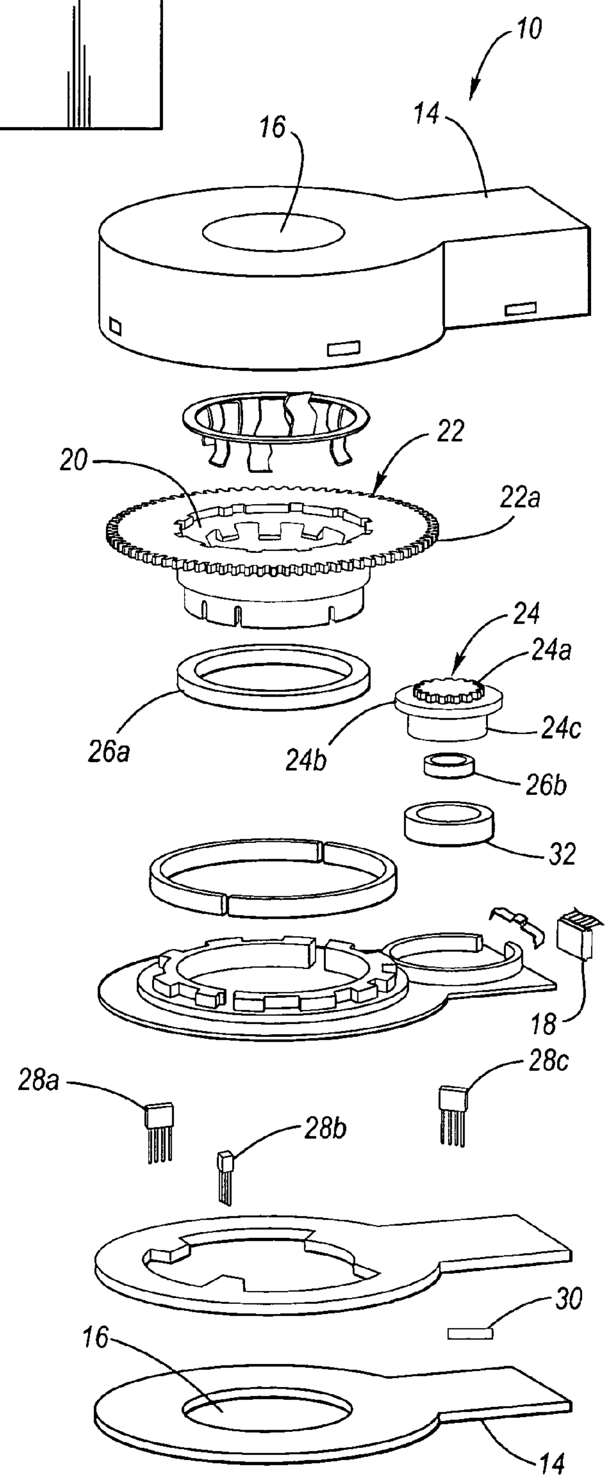
FIG. 2 is an exploded, perspective view of the prior art steering wheel position sensor of FIG. 1.
Figure 3:
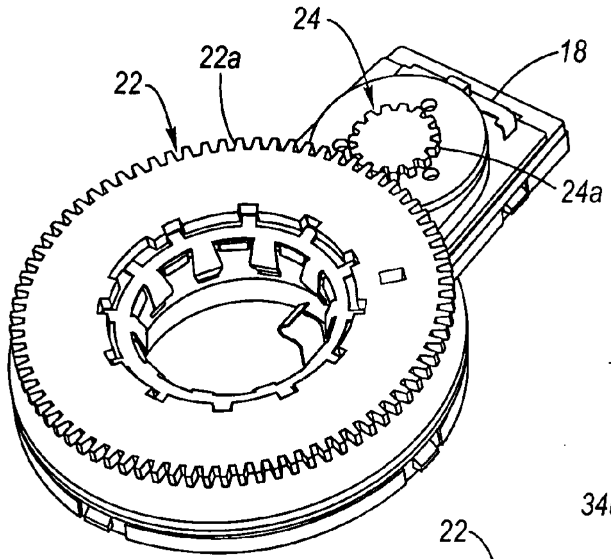
FIG. 3 is a perspective interior view of the prior art steering wheel position sensor of FIG. 1, showing in particular the main and auxiliary gears thereof.
Figure 4:
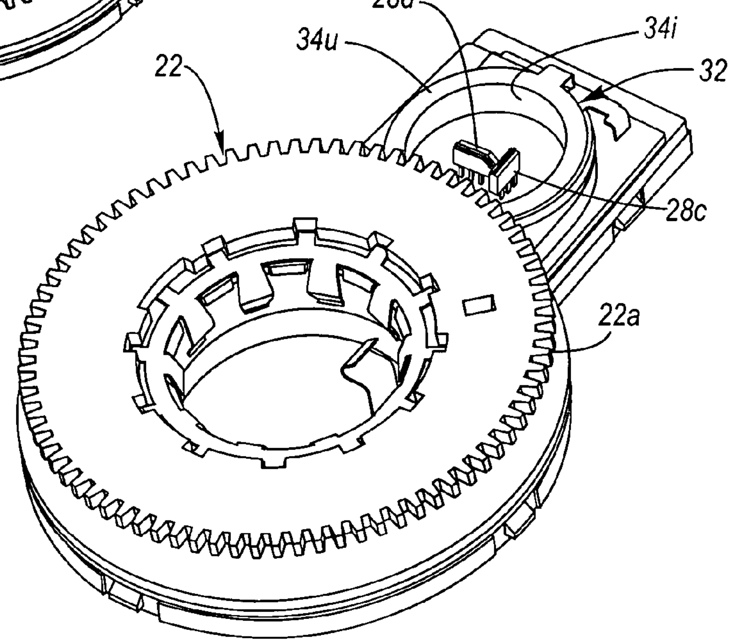
FIG. 4 is a perspective interior view as in FIG. 3, wherein now the auxiliary gear has been removed to show a ring shield thereof.
Figure 5:
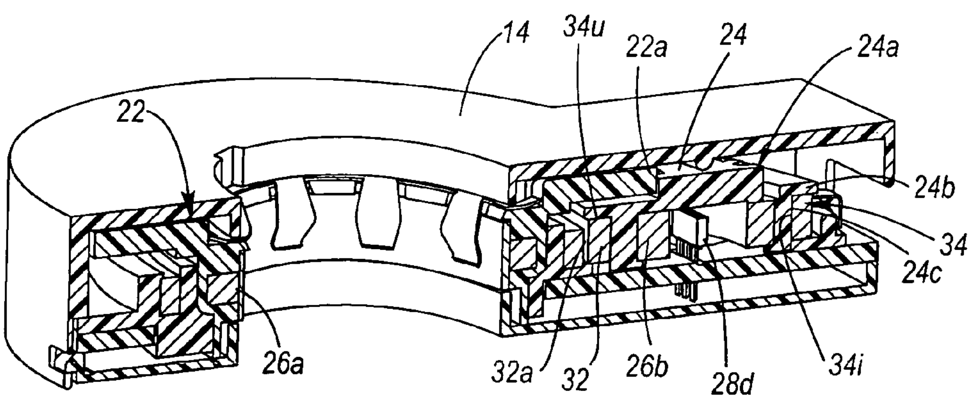
FIG. 5 is a partly sectional, perspective side view of the prior art steering wheel position sensor of FIG. 1.
Figure 7:
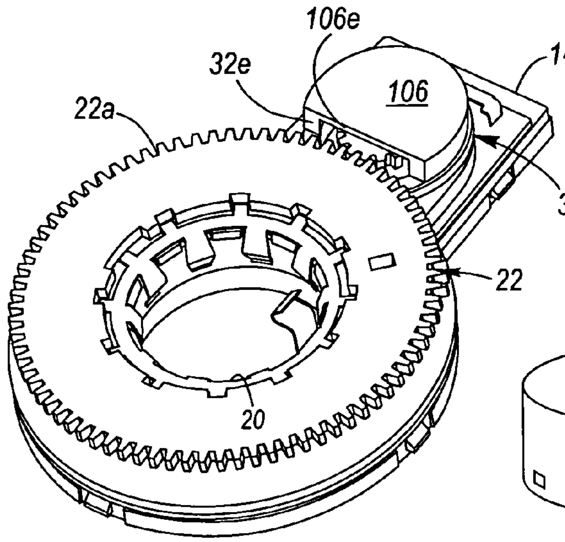
FIG. 7 is a perspective interior view of the improved steering wheel position sensor according to the present invention.
Figure 6:
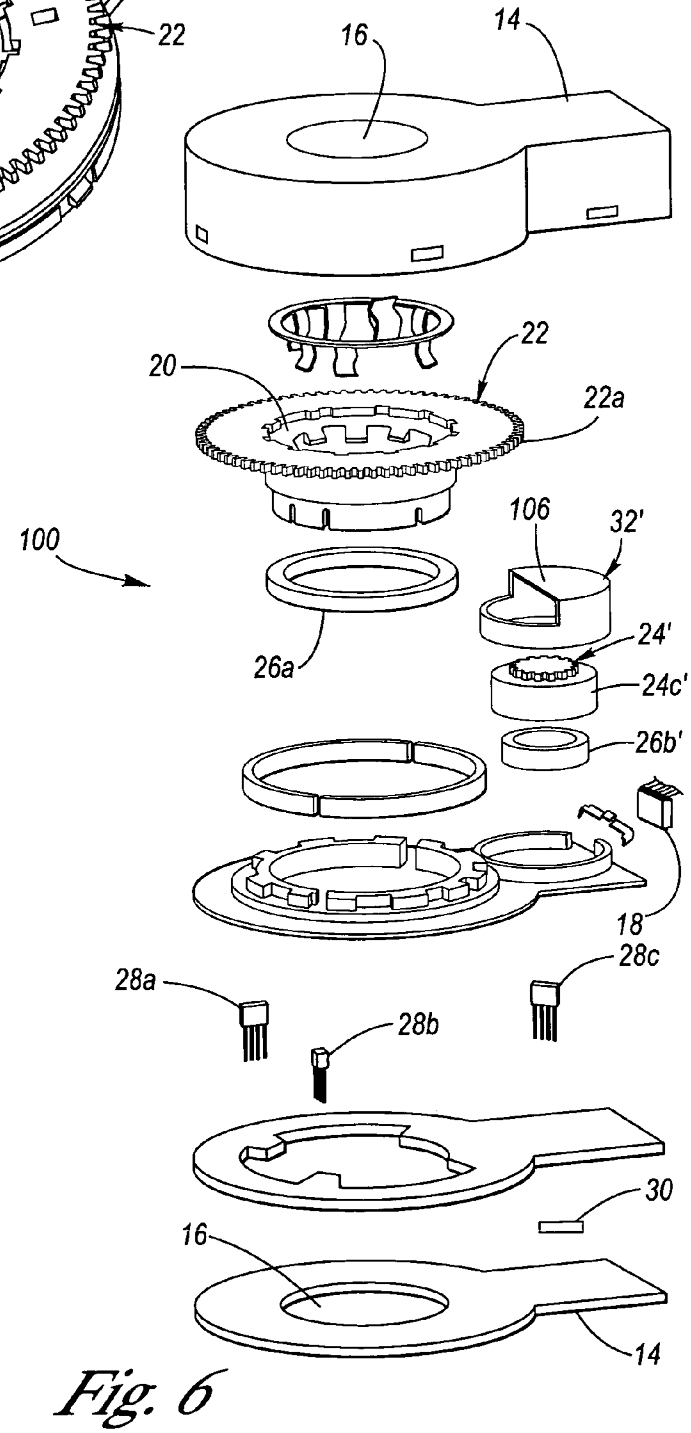
FIG. 6 is an exploded, perspective view of the steering wheel position sensor according to the present invention.
Figure 8:
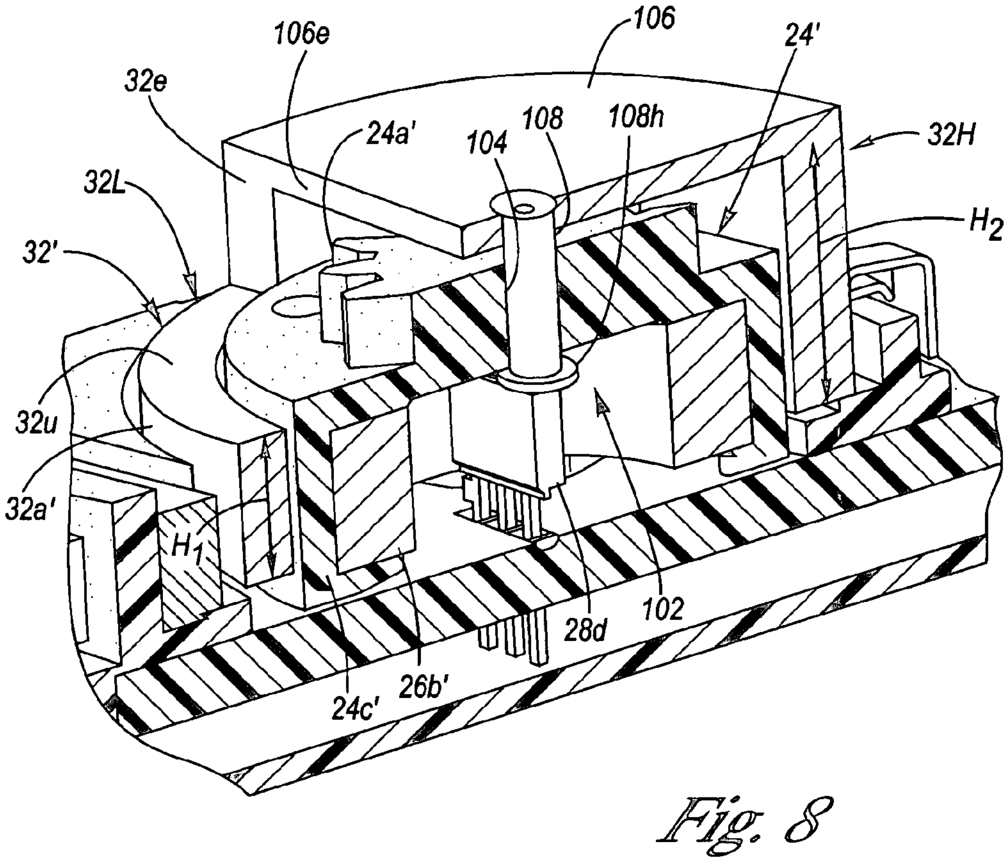
FIG. 8 is a detail, partly sectional, perspective side view of the improved steering wheel position sensor of FIG. 6, showing in particular the auxiliary gear and its bearing.
Figure 9:
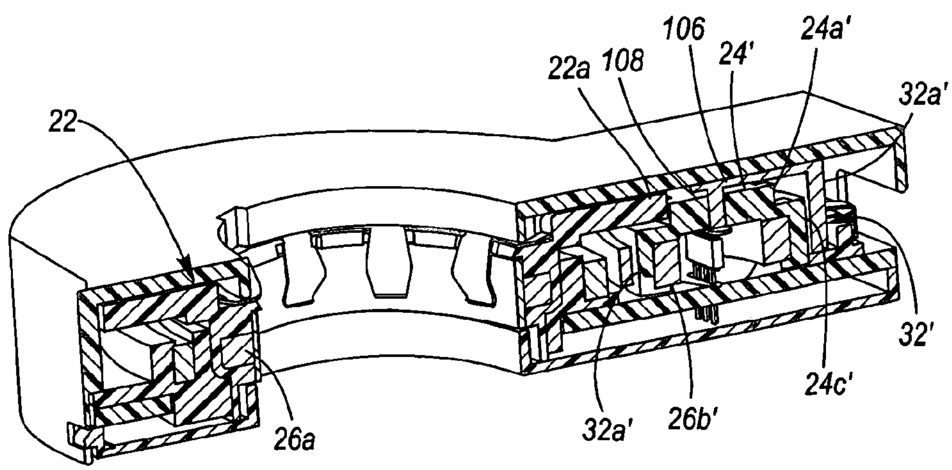
FIG. 9 is a partly sectional perspective side view of the improved steering wheel position sensor of FIG. 6.

Referring now to the Drawing, FIGS. 6 through 9 depict an improved steering wheel position sensor 100 according to the present invention. In this regard, all components identical with those of the aforedescribed conventional steering wheel position sensor 10 will be labeled in FIGS. 6 through 9 using the same numerals, wherein a further elaboration of the structure and function thereof is unnecessary for the sake of brevity, and wherein parts of modified components will be designated by the same numerals of the conventional steering wheel position sensor 10 now with a prime.

The improved steering wheel position sensor 100 according to the present invention has all components as hereinabove described with respect to the prior art steering wheel position sensor 10, including the housing 14 with its mounting hole 16, main gear 22 with its engagement aperture 20, and the sensing electronics, wherein only the environs of the auxiliary gear 24' are now modified to provide an improved auxiliary gear bearing 102 therefor (see FIG. 8) according to the present invention.

The auxiliary gear 24' has teeth 24*a'* enmeshed with the teeth 22*a* of the main gear 22, and is provided with a centrally disposed axle hole 104. An annular base 24*c'* is connected thereto (the annular lip described hereinabove with respect to the conventional steering wheel position sensor 10 is not present). The auxiliary gear 24' further includes therewithin an annular magnet 26*b'*.

The ring shield 32' is modified from that of the conventional steering wheel position sensor 10, wherein the ring shield wall 32*a'* now includes a low rise portion 32L adjacent the main gear 22 and a high rise portion 32H distally spaced from the main gear.

The low rise portion 32L of the ring shield wall 32*a'* has a height similar to that of the above described conventional ring shield wall adjacent the main gear 22 (encompassing the area circumscribed by the meshing of the teeth 22*a*, 24*a'*). In this regard, the height $H_1$ of the ring shield wall 32*a'* at the low rise portion 32L is such that the upper surface 32*u* is below the height of the teeth 24*a'* of the auxiliary gear 24', whereby the enmeshed teeth 22*a*, 24*a'* are free of, and unencumbered by, the low rise portion of the ring shield wall.

Distally from the main gear 22 is the high rise portion 32H of the ring shield wall 32*a'*, wherein the height $H_2$ thereof rises above the auxiliary gear 24'. A wall edge 32*e* defines the demarcation between the low and high rise portions 32L, 32H of the ring shield wall 32*a'*.

A truncated plate 106 is connected (preferably integrally) with the high rise portion 32H, wherein the truncation edge 106*e* coincides with the wall edge 32*e*. The truncated plate 106 occupies (per the depicted embodiment) over fifty percent of the area of the ring shield 32', wherein the truncated plate 106 overlies the axial center of the ring shield.

An axle 108 is connected to the truncated plate 106 at the axial center of the ring shield 32'. The axle 108 projects downwardly in perpendicular relation to the truncated plate 106.

The improved auxiliary gear bearing 102 is provided by the axle 108 being received by the axle hole 104. The axle is held fixed relative to the truncated plate, as for example by the axle, after having passed through the axle hole 104 and through a hole in the truncated plate, being then spread into a press fit with the truncated plate by application of a punch axially upon the end of the axle. A head 108*h* of the axle 108 holds, in freely rotatable relation, the auxiliary gear 24' relative to the ring shield 32'.

The dimensions of the ring shield wall 32*a'* and the annular base 24*c'* are such that the annular base does not contact the ring shield wall when the auxiliary gear is mounted bearingly on the axle 108. Accordingly, the auxiliary gear 24' is able to rotate on the axle 108 without any frictional engagement with the ring shield 32', the only contact being at the axle. This structural improvement results in the elimination of frictional effects occasioned by the former use of the upper and inner guide surfaces, both of which being now obviated.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A position sensor, comprising:
- a housing;
- a main gear located within said housing;
- a ring shield located within said housing, said ring shield comprising a ring shield wall;
- a plate connected to said ring shield wall;
- an axle connected to said plate in perpendicular relation thereto; and
- an auxiliary gear located within said housing, said auxiliary gear rotatably mounted to said axle, said main gear being gearingly meshed with said auxiliary gear;
- wherein said auxiliary gear is located external of said main gear with respect to the ring shield, wherein rotation of said main gear causes rotation of said auxiliary gear, and wherein said auxiliary gear is bearingly supported on said axle.

2. The sensor of claim 1, wherein said axle is disposed at an axial center of said ring shield; and wherein said auxiliary gear is free of contact with respect to said ring shield.

3. The sensor of claim 2, wherein said ring shield wall comprises:
- a low rise portion adjacent said main gear; and
- a high rise portion distally disposed in relation to said main gear;
- wherein said plate is connected to said high rise portion of said ring shield wall.

4. The sensor of claim 3, wherein a wall edge of said ring shield wall demarcates said high and low rise portions; and wherein said plate is truncated by a truncation edge, the wall edge coinciding with the truncation edge.

5. The sensor of claim 4, further comprising:
- a first annular magnet located within said main gear;

a second annular magnet located within said auxiliary gear; and sensing electronics within said housing detecting magnetic field rotation of the first and second magnets, respectively, in response to an induced rotation of said main gear.

6. A position sensor, comprising:

a housing;

a main gear located within said housing;

a ring shield located within said housing, said ring shield comprising a ring shield wall;

a plate connected to said ring shield wall;

an axle connected to said plate in perpendicular relation thereto; and an auxiliary gear located within said housing, said auxiliary gear being rotatably mounted to said axle, said main gear being gearingly meshed with said auxiliary gear;

wherein said auxiliary gear is located external of said main gear with respect to the ring shield, wherein rotation of said main gear causes rotation of said auxiliary gear, and wherein said auxiliary gear is bearingly supported on said axle; and wherein said auxiliary gear is free of contact with respect to said ring shield.

7. The sensor of claim 6, wherein said ring shield wall comprises:

a low rise portion adjacent said main gear; and a high rise portion distally disposed in relation to said main gear;

wherein said plate is connected to said high rise portion of said ring shield wall; and wherein a wall edge of said ring shield wall demarcates said high and low rise portions; and wherein said plate is truncated by a truncation edge, the wall edge coinciding with the truncation edge.

8. The sensor of claim 7, wherein said axle is disposed at an axial center of said ring shield.

9. The sensor of claim 8, further comprising:

a first annular magnet located within said main gear;

a second annular magnet located within said auxiliary gear; and sensing electronics within said housing detecting magnetic field rotation of the first and second magnets, respectively, in response to an induced rotation of said main gear.

10. A position sensor, comprising:

a housing;

a main gear located within said housing;

a ring shield located within said housing, said ring shield comprising a ring shield wall having a low rise portion adjacent said main gear; and a high rise portion distally disposed in relation to said main gear;

a plate connected to said high rise portion of said ring shield wall;

an axle connected to said plate in perpendicular relation thereto; and an auxiliary gear located within said housing, said auxiliary gear being rotatably mounted to said axle, said main gear being gearingly meshed with said auxiliary gear;

wherein rotation of said main gear causes rotation of said auxiliary gear, wherein said auxiliary gear is bearingly supported on said axle; wherein said auxiliary gear is free of contact with respect to said ring shield, and wherein a wall edge of said ring shield wall demarcates said high and low rise portions; and wherein said plate is truncated by a truncation edge, the wall edge coinciding with the truncation edge.

11. The sensor of claim 10, further comprising:

a first annular magnet located within said main gear;

a second annular magnet located within said auxiliary gear; and sensing electronics within said housing detecting magnetic field rotation of the first and second magnets, respectively, in response to an induced rotation of said main gear.

* * * * *